UNITED STATES PATENT OFFICE.

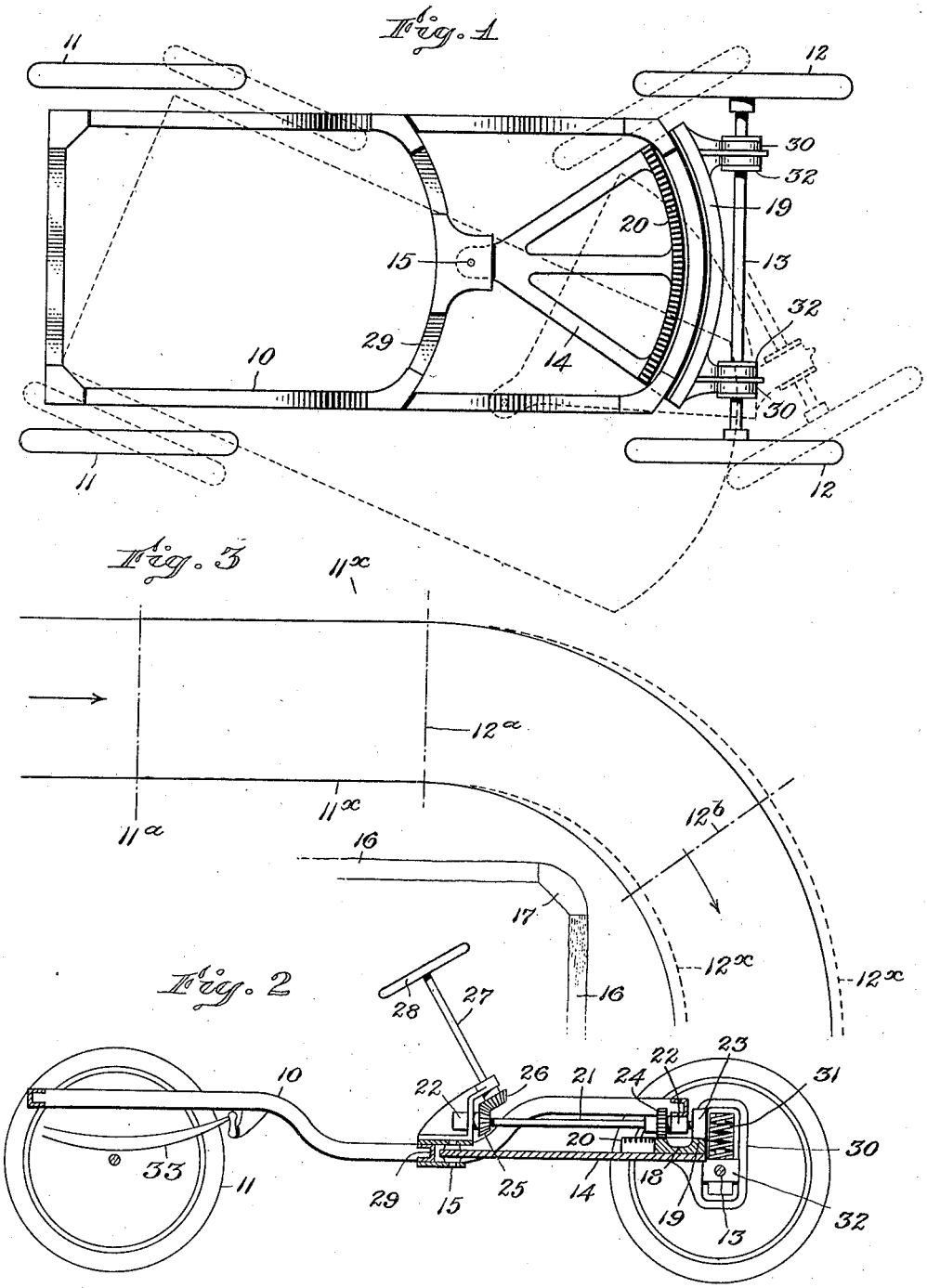

JOHN CHARTER, OF WHITMAN, MASSACHUSETTS.

VEHICLE.

1,057,479.   Specification of Letters Patent.   Patented Apr. 1, 1913.

Application filed April 10, 1912. Serial No. 689,704.

*To all whom it may concern:*

Be it known that I, JOHN CHARTER, a citizen of the United States, and resident of Whitman, in the county of Plymouth and State of Massachusetts, have invented certain new and useful Improvements in Vehicles, of which the following is a specification.

This invention relates to vehicles, and particularly to motor vehicles.

The invention consists in an arrangement of the wheels of a vehicle whereby the tendency to skid is eliminated and whereby the vehicle is adapted to turn about in a smaller space than other vehicles of the same size which have other arrangement of the wheels.

The invention also consists in means for swinging the front wheels to the right or left for steering the vehicle.

Of the accompanying drawings which illustrate one form in which the invention may be embodied: Figure 1 represents a top plan view of the running frame of a vehicle, showing the same in solid lines in position to proceed in a straight course, and showing the outline of the vehicle in dotted lines in position to describe a curve to the left. Fig. 2 represents a longitudinal vertical section of the running frame with the addition of manually operative means for steering the same. Fig. 3 represents a diagram representing in dotted lines the course of the front wheels, and in solid lines the course of the rear wheels in describing a curve.

The same reference characters indicate the same parts wherever they occur.

The vehicle comprises a skeleton frame 10 for supporting a body (not shown), two rear wheels 11, two front wheels 12, and other structure hereinafter described. The front wheels are mounted upon an axle 13 with relation to which they are adapted to rotate independently. The axle is mounted in a steering frame 14 which is adapted to swing from side to side about a vertical axis. The fulcrum or pivotal point of the swinging frame is indicated at 15. This pivotal point is located in the longitudinal median line of the vehicle between the front and rear wheels and at a considerable distance to the rear of the front wheels. The effect of placing the pivot at this point is to swing the forward end of the vehicle frame in the opposite direction to that toward which the front wheels are turned when the vehicle is stationary. This is clearly shown by Fig. 1, in which the front wheels are turned to the left and the forward end of the frame 10 is swung to the right, but this lateral movement of the frame 10 would be wholly or partially avoided if the vehicle were in motion when the front wheels were turned. This feature of the invention eliminates the tendency of the vehicle to skid. The rear of a vehicle, because of momentum, tends to follow the prior straight course when the front wheels are turned to describe a curve. In the present instance, however, the moment that the front wheels are turned to one side, the rear wheels turn to the other, thus enabling the rear wheels to roll rather than skid in the direction which the rear of the vehicle tends to follow. The progress of the vehicle neutralizes the lateral movement of the frame 10 and enables the rear wheels to roll in, and the vehicle body to follow, the prior straight course for a considerable distance after the front wheels have left the straight course.

Fig. 3 illustrates the course of the wheels when the vehicle changes from a straight course to a circular course. In this figure the direction of the vehicle is indicated by an arrow, and it is steered to cause it to describe a curve to the right. The course of the rear wheels is indicated by solid lines $11^x$, and the course of the front wheels is indicated by dotted lines $12^x$. It may be assumed that the vehicle proceeding in the direction of the arrow has proceeded in a straight course until the rear wheels arrive at $11^a$ and the front wheels at $12^a$. If the front wheels are turned to the right at $12^a$, they describe a curve to the right. The relative movement of the frame 10 to the left is neutralized, provided the vehicle continues moving forward. The angle of the frame 10, being thus kept substantially parallel to the former straight course, causes the rear wheels to hold the straight course for a considerable distance to point $12^a$, for example. Assuming that the rotation of the steering wheel ceases when the rear wheels reach $12^a$, the rear wheels begin to follow a curved course concentric to the then course of the front wheels which have reached $12^b$.

The placing of the pivot 15 at the rear of the front wheels has the effect of shortening the running frame so that the rear wheels follow more closely the course of the front wheels than if the pivot 15 were as far forward as the vertical plane of the front axle. This feature enables the rear wheels to more readily avoid obstacles, such for example as a curb corner. Straight curbs are indicated in Fig. 3 at 16 and a corner curb is indicated at 17. The space between the course of the front wheels and the course of the rear wheels is much narrower than it would be if the steering pivot or pivots of the front wheels were as far forward as the axis of the front wheels.

It will be noted that the body-supporting part of the frame 10 extends well forward beyond the pivot 15, and that the front wheels are so far forward with relation to the front end of the said frame that they pass in front of the same when turned to one side or the other. This not only avoids interference of the outer wheel with the vehicle frame but also avoids interference between the inner wheel and the frame. The structure as shown is capable of enabling the front wheels to stand substantially at right angles to the axis of the rear wheels without causing interference between the front wheels and the frame. This arrangement also avoids the necessity of cutting under the frame, because when the front wheels are turned to either side of their median position the inner wheel is moved away from the vehicle frame.

Fig. 2 includes mechanism for swinging the frame 14 to steer the vehicle. A segmental member 18 is affixed to the forward part of the frame 14. This member 18 is provided with a segmental track 19 and with a segmental toothed rack 20. A shaft 21 is mounted in bearings 22 carried by the frame 10. This shaft is provided with a smooth roller 23 and with a toothed gear 24. The roller and the gear engage respectively the track 19 and the toothed segment 20. At the rear of the shaft 21 is a bevel gear 25 which is engaged by a gear 26 on a steering post 27. The post is provided with a steering wheel 28. The front end of the vehicle frame 10 is supported by the roller 23 and track 19, the track being supported by the swinging frame 14, and the frame 14 being supported at its forward end by the axle 13 and at its rear end by a crosspiece 29 of the frame 10. When the steering post is turned, rotation is transmitted to the roller 23 and gear 24. The roller rolls upon the track 19 and the gear acts positively upon the toothed segment 20 to swing the front of the vehicle frame to one side or the other. If the vehicle is standing still when the steering post is turned, the front axle will turn about a vertical axis midway between the wheels 12, as represented by Fig. 1.

The swinging frame 14 is adapted to afford a spring mounting such as that shown by Fig. 2. Spring boxes 30, 30, extend forward from the front of the frame 14. A helical compression spring 31 is arranged in each box 30, the upper part of the box resting upon the upper end of the spring. The springs rest upon blocks 32 on the axle 13, the blocks and boxes being adapted to slide vertically with relation to each other. In this way the axle supports the springs, the springs support the boxes, the boxes support the front of the swinging frame 14, and the frame 14 supports the front end of the vehicle frame 10. The rear end of the frame 10 is supported by springs such as that indicated at 33, which springs are mounted upon the rear axle 34 in the usual way so that the angular relation of the rear axle and frame 10 may not vary. The phrase "angular variation" refers to the relation which exists between the axis of the axle and the longitude of the vehicle, and does not mean that one end of the axle cannot move up and down relatively to the frame and relatively to the other end of the axle, because such up and down movement is obviously necessary in order to utilize the supporting springs 33. In this way the forward end of the frame 14 is supported by springs, while the rear end of the frame 10 is supported by springs, the rear of the frame 14 being supported by the frame 10 and the front of the frame 10 being supported by the frame 14.

I claim:

A vehicle comprising front wheels, a front axle, a steering frame carried by said axle and extending toward the rear, rear wheels, a rear axle, a body-supporting frame carried by said rear axle and extending forwardly beyond the rear end of the steering frame, pivotal means connecting said frames between the axles, the axis of said means being vertical, a track on said steering frame in front of said pivotal means, a shaft mounted on the body-supporting frame and extending longitudinally thereof, a roll on said shaft arranged to roll on said track to support the front end of said body-supporting frame, a toothed gear on said shaft, a toothed segment affixed to said steering frame in coactive relation to said gear, and manually operative means on the body-supporting frame for turning said shaft.

In testimony whereof I have affixed my signature, in presence of two witnesses.

JOHN CHARTER.

Witnesses:
W. P. ABELL,
P. W. PEZZETTI.

Copies of this patent may be obtained for five cents each, by addressing the "Commissioner of Patents, Washington, D. C."